United States Patent [19]
Willoteaux

[11] 3,784,800
[45] Jan. 8, 1974

[54] SYSTEMS FOR SURVEYING AND CORRECTING TRAJECTORIES

[75] Inventor: Guy Claude Willoteaux, Saint-Germain-en-Laye, France

[73] Assignee: Societe Francaise d'Equipments pour la Navigation Aerodrome de Villacoublay

[22] Filed: May 26, 1972

[21] Appl. No.: 257,345

[30] Foreign Application Priority Data
May 27, 1971 France .............................. 7119184
May 27, 1971 France .............................. 7119185

[52] U.S. Cl..... 235/150.27, 235/150.2, 235/150.26, 244/3.15, 343/112 CA
[51] Int. Cl. ............................................. G06g 7/78
[58] Field of Search .................. 235/61.5 S, 61.5 T, 235/150.2, 150.26, 150.27; 343/7.7, 12 MD, 112 C, 112 D, 112 CA; 244/3.1, 3.15, 3.19, 77 B, 77 C; 73/167

[56] References Cited
UNITED STATES PATENTS
3,582,626  6/1971  Stansbury ....................... 235/150.2
3,434,141  3/1969  Welti ............................. 244/3.19 X
3,403,396  9/1968  Van Popta et al. ...... 235/150.27 UX
3,310,806  3/1967  Stansbury ....................... 343/112 CA
3,469,079  9/1969  Stansbury .................. 343/112 CA X
3,242,487  3/1966  Hammack ................ 235/150.27 UX Primary Examiner—Eugene G. Botz
Assistant Examiner—Jerry Smith
Attorney—Eric H. Waters et al.

[57] ABSTRACT

A system for controlling the trajectory of a moving body such as an aircraft or missile moving in the vicinity of one or more relevant objects which may be moving or stationary. The trajectory is required to fulfil certain imperatives such that the body following it either avoids the relevant object by at least a specified distance or the imperatives may require the body to hit or come within at least a specified distance of the object. The system calculates the distance between the body and object and by taking account of the speeds and direction of each simulates a series of hypothetical trajectories diverging on either side of the actual trajectory until a hypothetical trajectory is determined which satisfies the imperatives, the system then instructs the body's controls to change the linear and/or angular speed thereof so that the aircraft follows the latter trajectory.

7 Claims, 15 Drawing Figures

SYSTEMS FOR SURVEYING AND CORRECTING TRAJECTORIES

The invention relates to a system to be provided on a moving body, for the supervision and correction of a trajectory of the body moving about, in the vicinity of one or more relevant moving or stationary objects, along a trajectory ultimately provided to fulfil certain imperatives. These imperatives may be imperatives of avoidance in order to eliminate the possibility of collision between the moving body and the aforesaid moving or stationary relevant objects, which thus constitute obstacles, or even imperatives of approach intended to allow the moving body to reach said moving or stationary relevant object which thus constitute targets. A system of this type may advantageously complete the function of automatic pilot of an aircraft, a missile or a space missile.

The operation of this trajectory supervision and correction system is such that once the moving body thus equipped is moving along a trajectory, provided in advance, and if this trajectory is in accordance with the imperatives, the supervision system does not respond and no order to modify the trajectory is given. However, if this trajectory is not in accordance with the imperatives, the system simulates trajectories which are more and more divergent to obtain a so-called optimum trajectory, i.e. both as regards the said imperatives and the least divergent with respect to the trajectory provided. Then the system transmits to the moving body the instructions for the modification of the trajectory corresponding to the socalled optimum divergent trajectory.

The invention also relates to a simulation mock-up, corresponding to the said supervision system, which makes it easier to ascertain and test both during investigations and inspections.

The invention does not relate to, and on the contrary assumes that there is already established, the trajectory details of the moving body thus equipped, speed V, course $\psi$, course variation speed $\psi'$ and the position or trajectory details of the moving or stationary relevant objects Mi depending on which the provided trajectory of the moving body M thus equipped can no longer respond to the imperatives.

Distance $ai$
Bearing $\gamma i$
Speed $Vi$
Course $\psi i$
Course Variation speed $\psi'i$ According to the invention there is provided a trajectory supervision and correction system for a moving body equipped with said system, moving along its own trajectory in a space in which at least one other object (hereafter referred to as the relevant object) is stationary or moving, with respect to which said moving body thus equipped must move and with regard to which it must fulfil certain imperatives, said system comprising means for simulating in a very reduced period of time, firstly the actual relative trajectory of the moving body with respect to said relevant object, then a succession of hypothetical relative trajectories of alternate and increasing values diverging from said actual relative trajectory each of which hypothetical trajectory the body would follow in response to modification of its speed (linear and angular), means for calculating for each of these hypothetical trajectories, the distance at which the moving body following the hypothetical trajectory would pass with respect to the relevant object, means for immediately comparing each of these distances thus calculated with a constant reference value, and means for interrupting the trajectory simulations as soon as this comparison reveals a distance in accordance with the imperatives, and means for sending instructions to controls of the said moving body for the modification of the linear and angular speed, thus found.

Briefly the trajectory supervision and correction system according to the invention simulates in a very reduced time, firstly the actual relative trajectory for the moving body equipped with the system with respect to the said moving or stationary relevant object, then a series of hypothetical relative trajectories, diverging from the actual relative trajectory, provided by modifications of linear and/or angular speed of alternating and increasing values. For each of these trajectories the system calculates the distance at which it would cause the moving body to pass with respect to the object. The system according to the invention compares each of these approach distances, thus calculated with a constant reference value. As soon as this comparison reveals a distance according to the imperatives, the system interupts its trajectory simulations and sends to the controls of the moving body the instructions for modifying the speed (in magnitude and sign) thus found, and the moving body follows an optimum actual trajectory.

Preferably but not necessarily the trajectory supervision and correction system according to the invention responds to the sign of the derivative with respect to time of the simulated distance. If the imperatives are imperatives of avoidance, if the simulated distance is greater than the reference distance and if this derivative is positive, the system does not carry out other simulations than that the trajectory provided, and gives no orders to the controls of the moving body. It is only if this derivative is negative and if this simulated distance becomes less than the reference distance that the system carries out other simulations.

Similarly if the imperatives are imperatives of approach, if the simulated distance is less than the reference distance and if this derivative is negative, the system does not carry out simulations other than that of the trajectory provided and does not send orders to the controls of the moving body thus equipped. It is only if this derivative is positive and if this simulated distance becomes greater than the reference distance that the system carries out other simulations.

On the other hand, possibly but not necessarily, the invention makes it possible to simplify the circuits calculating the simulated distance:

$$a_{is} = \sqrt{(Xi - X)^2 + (yi - y)^2}$$

Substituting moduli in this addition, it becomes:

$$|X_i - X| + |Y_i - Y|$$

In addition and more particularly in the case where the imperatives are imperatives of avoidance, when several moving or stationary relevant objects are considered, the above described operation is carried out succesively for each of these relevant objects, moreover the said operation is repetitive; as soon as it has been terminated for a single relevant object or for the last of said relevant objects, it is repeated and this insure that the moving body will avoid any collision, even with a rapidly moving relevant object (or aircraft).

The method of action of the above trajectory supervision and correction system according to the invention is modifications of the course variation speed '; its method of action may also relate to modifications of the speed V as evident for a man skilled in the art, for example by acting on the propulsion system.

Briefly, the simulation mock-up comprises on the one hand the said trajectory supervision and correction system according to the invention, and on the other hand it comprises mock-ups simulating the trajectories provided for the moving body thus equipped and for the said relevant objects, and means for making this visible by e.g. an oscilloscope.

The invention will be described by way of example with reference to the following drawings in which.

Figure 1:
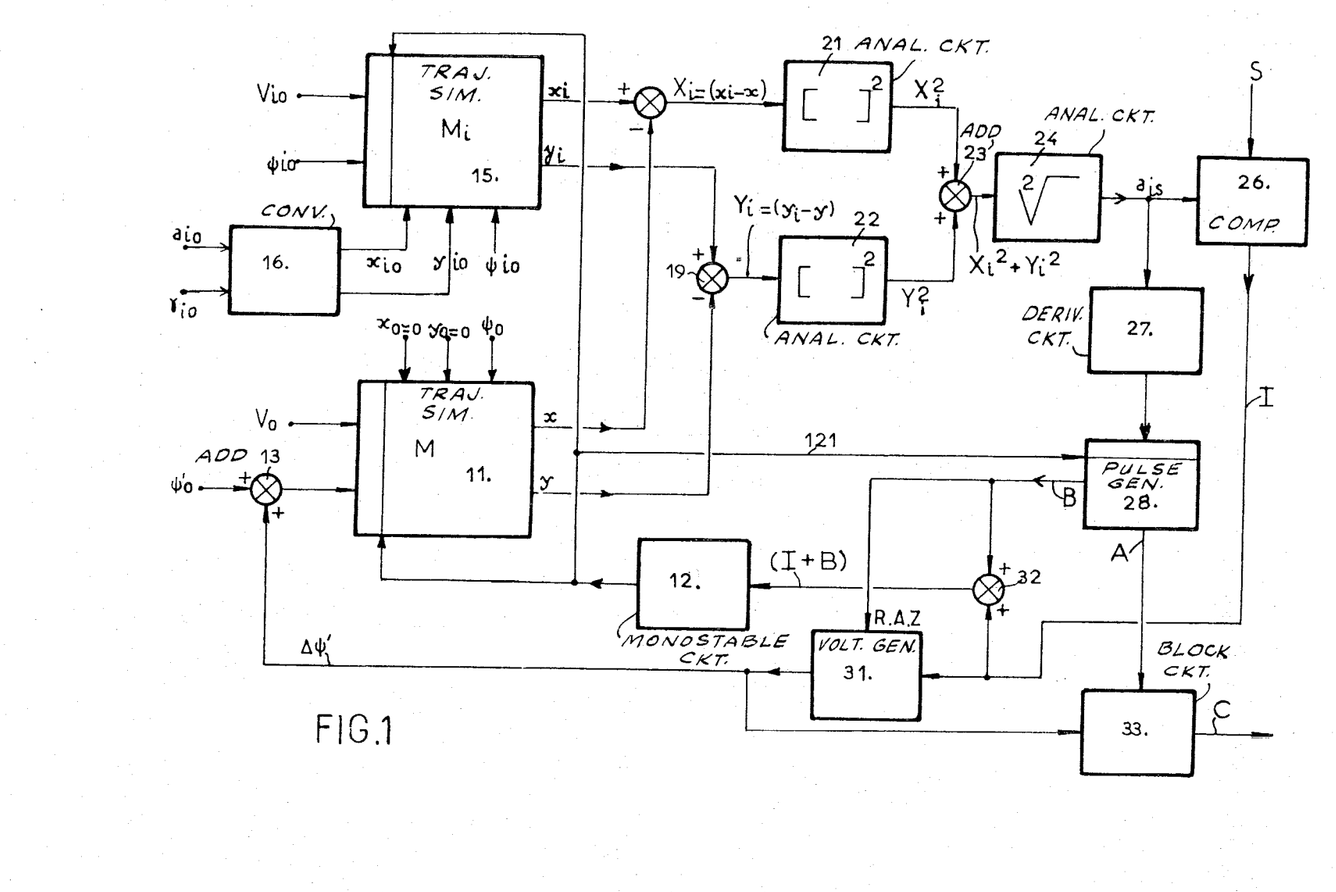
FIG. 1 is a circuit diagram of an embodiment of a trajectory supervision and correction system according to the invention for on board an aircraft.

FIG. 1 shows the circuit diagram of an embodiment of the trajectory supervision and correction system according to the invention for and onboard an aircraft M. This device comprises a trajectory simulator 11 for the aeroplane M; this simulator 11 receives the signals $x_o=0$ and $y_o=0$ of the initial position (given originally in rectangular co-ordinates) of the aircraft M and the signal $\psi o$ of its initial course; on the other hand, under the control of a monostable circuit 12 (whose function will be explained hereafter) it receives the signal Vo of initial speed of the aircraft M and the signal provided by an adding device 13, representing the sum of the initial variation $\psi'o$ of the course of the aircraft M and of an order $\Delta\psi'$ of simulated turning (as explained hereafter). The system comprises a trajectory simulator 15 for a relevant aircraft $M_i$, a converter 16 receives the initial values of the distance $a_{io}$ and bearing $\gamma_{io}$ of the relevant aircraft $M_i$ and transforms them into its initial rectangular co-ordinates $x_{io}$ and $y_{io}$, the simulator 15 receives these signals $x_{io}$ and $y_{io}$ from the converter 16, and the signal $\psi_{io}$ of the initial course of the aircraft $M_i$ on the other hand, under the control of the monostable circuit 12, the simulator 15 receives the signal $V_{io}$ of initial speed and the signal $\psi'_{io}$ of initial variation of course of the aircraft $M_i$. When the monostable circuit 12 gives them the order to do so, the simulators 11 and 15 simulate the trajectories of the aircraft M and $M_i$ and provide the corresponding signals at $x$ and $y$ for the aeroplane M and at $x_i$ and $y_i$ for the aeroplane $M_i$. Two substracting devices 18 and 19 calculate the differences $X_i$ equals $x_i - x$ and $Y_i = y_i - y$; Two analogue circuits 21 and 22 calculate the squares $X_i^2$ and $Y_i^2$, of these differences; an adding device 23 calculates their total $X_i^2 + Y_i^2$, one analogue circuit 24 calculates the square root which is the simulated distance $a_{is}$ of the aircraft $M_i$. This signal $a_{is}$ of the simulated distance is used in two processes; in one a comparator 26 compares it with a registered signal S representing the reference distance to be taken into consideration and emits a pulse I depending on the sign of the difference ($a_{is} - $ S); in the other the signal $a_{is}$ is an input to a derivation circuit 27, which controls a pulse generator 28 depending on the sign of the derivative $a_{is}'$.

In the case where the imperatives are imperatives of avoidance the system insures that, with the double proviso that the simulated distance $a_{is}$ is greater than the reference distance S and that its derivative $a_{is}'$ is positive, no other simulation is carried out and no avoidance instruction is transmitted to the controls of the aircraft M. In other cases, i.e. if the derivative $a_{is}'$ is negative, when the distance $a_{is}$ becomes less than the safety distance S, the comparator 26 and the pulse generator 28 on the one hand control a voltage generator 31 which sends the instruction $\Delta\psi'$ of simulated turning to the adding device 13, and on the other hand, by the intermediary of an adding device 32 to control the monostable circuit 12. Thus a second simulation is obtained, the instruction $\Delta\psi'$ of simulated turning being chosen depending on advisability. In particular this instruction may assume successively the value of the term of an alternated progression, e.g. the alternated arithmetic progression 0,$c$,-$c$ 2$c$,-2$c$,3$c$, etc.. When the minimum value of the simulated distance $a_{is}$ becomes greater than the safety distance S the device stops the simulations and the signal $\Delta\psi'$, which has given this result, is sent, by a blocking circuit 33, controlled by the pulse generator 28, to controls C of the aircraft M. Then the signal $\Delta\psi'$ is reset to 0, and the device deals with another aircraft.$M_i$. When it is controlled, the monostable circuit 12 causes the return of the initial conditions. When the control pulse of the monostable circuit 12 comes from the comparator 26, the derivative $a_{is}'$ which was negative becomes positive, but the line 121 leading from the monostable circuit 12 to a blocking input of the generator 28 thus prevents the latter from being controlled by the derivation element 27.

In the case when the imperatives are approached imperatives, the device insures that (with the double proviso that the simulated distance $a_{is}$ is less than the reference distance S and that its derivative $a_{is}'$ is negative) no other simulation is carried out and no avoidance order is sent to the controls of the aircraft M. In other cases i.e. if the derivative $a'_{is}$ is positive, when the distance $a_{is}$ becomes greater than the reference distance S, the comparator 26 and pulse generator 28 on the one hand control a voltage generator 31, which sends the said order $\Delta\psi'$ of simulated turning to said adding device 13, and on the other hand, by the intermediary of an adding device 32 control the said monostable circuit 12 (these circuits will be described hereafter). A second simulation is thus obtained, the order $\Delta\psi'$ of simulated turning being chosen according to advisability. In particular this order may assume successively the value of the term of an alternated progression, e.g. the alternated arithmetic progression $0,c, -c, 2c-2c, 3c$, etc.. When the minimum value of the simulated distance $a_{is}$ becomes less then the reference distance S, the device stops the simulations, and the signal $\Delta\psi'$, which has given this result, is sent, by a blocking circuit 33, controlled by the pulse generator 28, to the controls C of the aircraft M; then the signal $\Delta\psi'$ is reset to 0. The monostable circuit 12, when it is controlled, causes the re-establishment of the initial conditions; when the control impulse of the monostable 12 comes from the comparator 26, the derivative $a'_{is}$ which was positive becomes negative, but the wire 121 leading from the monostable 12 to a blocking input of the generator 28, this prevents the latter from being controlled by the derivation device 27.

Figure 2:
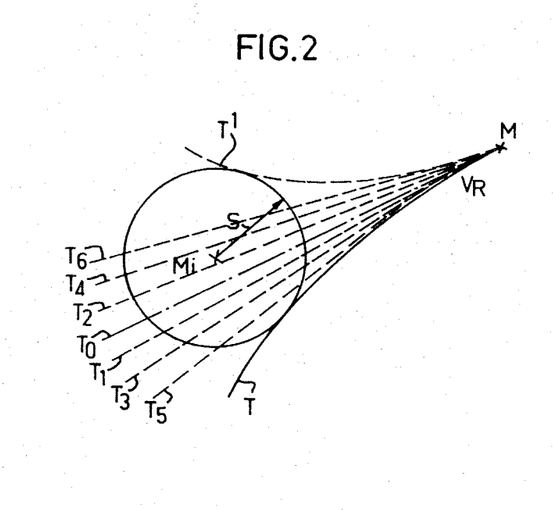
FIGS. 2 and 3 are explanatory diagrams of certain points of operation of the aforesaid system in the case where the imperatives are approach imperatives (FIG. 3) and in the case where the imperatives are avoidance imperatives (FIG. 2)

With reference to FIG. 2, and in the case where the imperatives are imperatives of avoidance, with respect to the aircraft $m_i$, the aircraft M is initially following an actual trajectory $T_o$ which will cause it to pass at less than the reference distance S taking into account the relative speed (in magnitude and direction) $V_R$ of the aircraft M with respect to the aircraft $M_i$. The trajectory supervision and correction system ascertains this fact in a first simulation and then carries out successive and alternate simulations of hypothetical trajectories $T_1, T_2, T_3, T_4$, etc. up to a trajectory T which does not pass through the circle centered on $M_i$ and of radius S. Trajectory T is therefore prescribed to the controls of the aircraft M. It will be noted that in the operation of the system there is no problem of zero: the operation remains the same if the unmodified trajectory $T_o$ passes exactly through the aircraft $M_i$. It will also be noted that during operation the system ignores trajectories such as $T^1$, which would cause the aircraft M to pass on the other side of the aeroplane $M_i$, but at the price of greater course modifications, which is neither desirable nor always possible and should therefore be avoided.

When it is a question of considering a plurality of objects whether they are moving (other aircraft) or stationary (obstacles on the ground), the trajectory supervision and correction system works repetitively; the repetition period T is divided for $n$ obstacles into $n$ intervals of time; during the interval $t_i = T/n$ the trajectory supervision and correction device deals with the relevant object $M_i$ etc. Naturally, the reduction in time during which the trajectory supervision and correction system operates increases with the number $n$ of relevant objects; by way of example a reduction of time of the order of 25 for simulations is sufficient in the case of two aeroplanes, but when the number $n$ of relevant objects is high it is necessary to provide a reduction of time of the order of a thousand, which the electronic circuits employed carry out with ease.

Figure 3:
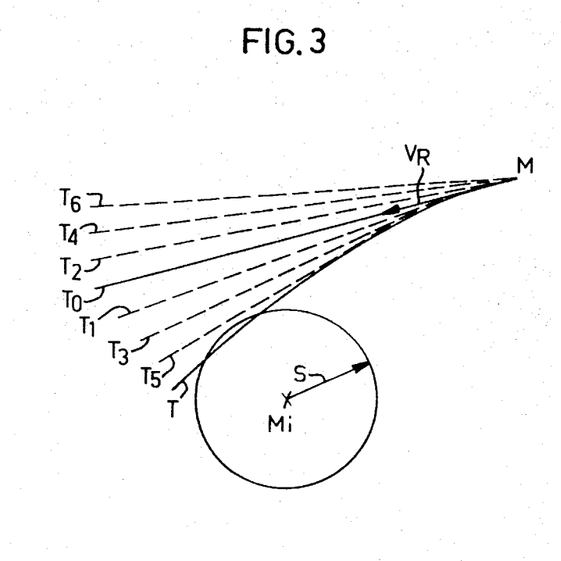

Referring to FIG. 3, in the case where the imperatives are imperatives of approach, with respect to the relevant object $M_i$ the aircraft M thus equipped follows a trajectory $T_o$ which would cause it to pass beyond the reference distance S, and by taking into account the relative speed (in magnitude and direction) $V_R$ of the aircraft M with respect of the relevant object $M_i$: the trajectory supervision and correction system ascertains the fact in a first simulation, then carries out successive and alternate simulations $T_1, T_2, T_3, T_4$, etc. up to a trajectory T which passes through the circle centered on $M_i$ and a radius S, Trajectory T is then prescribed to the controls of the aircraft M. In the system according to the invention it will be noted that there is no zero problem. Its operation remains the same if the unmodified trajectory $T_o$ passes exactly through the relevant object $M_i$.

Figure 4:
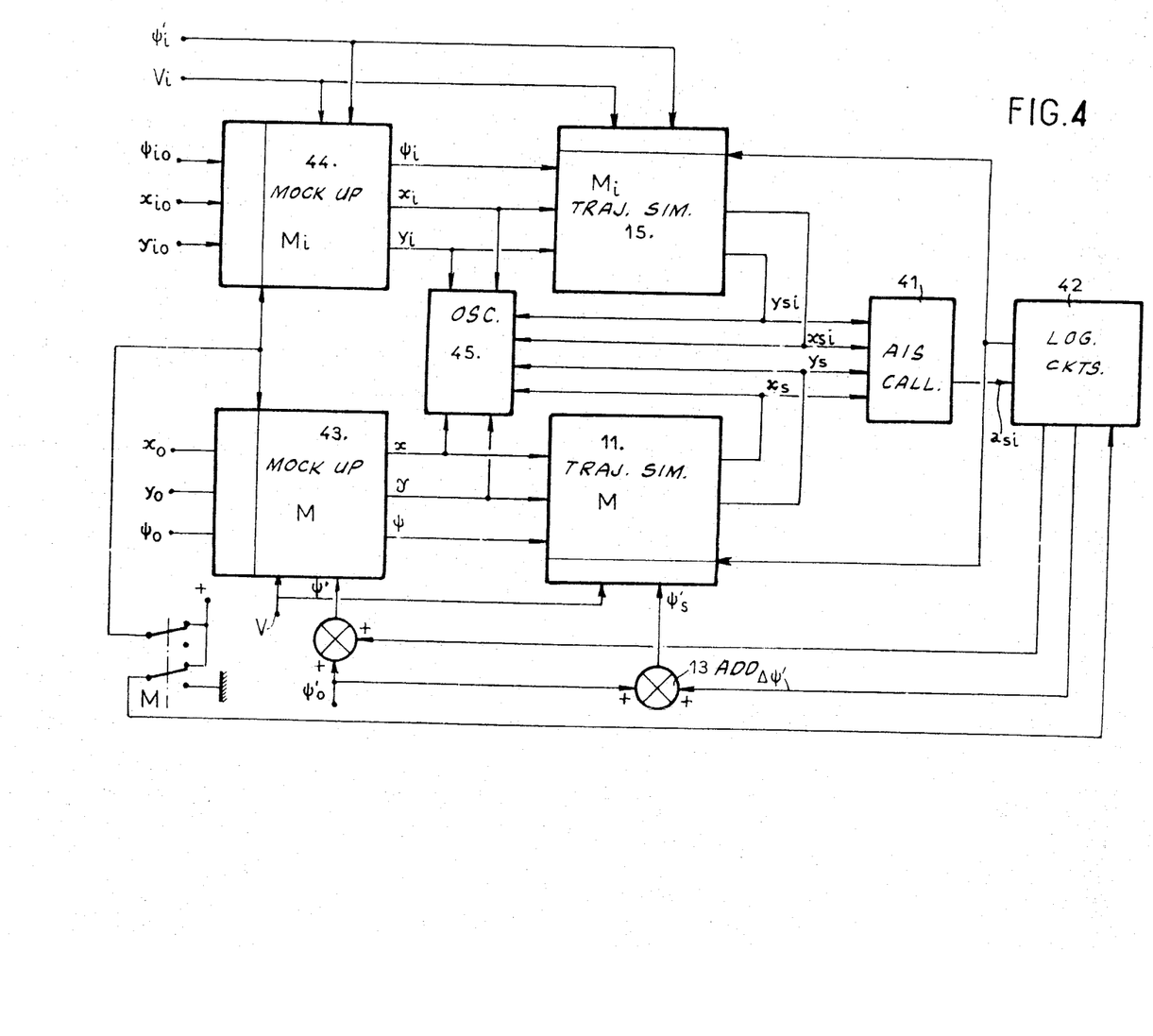
FIG. 4 is a circuit diagram of a simulation mock-up utilizing the trajectory supervision and correction system according to the invention.

Reference is now made to FIG. 4, which is a circuit diagram of a simulation mock-up utilizing the superivision and correction system according to the invention. There can be seen the simulator 11 for the aeroplane M with an adding device 13, its input at $\psi'$, and the simulator 15 for the aircraft $M_i$. Circuits for calculating $a_{is}$ are re-grouped at 41, and logic circuits at 42. The simulation mock-up moreover comprises a mock-up 43 for the aircraft M and a mock-up 44 for the aircraft $M_i$. These two mock-ups are, very simply, based on the same ideas as the simulators 11 and 15, and differ from them only in the reduction of time, which may be e.g. of the order of one for mock-ups 43 and 44 and of the order of 25 for simulators 11 and 15 (which will be explained hereafter). The trajectories of the two aircraft are observed on a screen of a four-path oscilloscope 45, which shows both, with relation to the ground, the actual trajectories (inputs $xy$ and $x_1y_1$) and the simulated trajectories (inputs $x_s, y_s$ and $x_{is}, y_{is}$).

Figure 5:
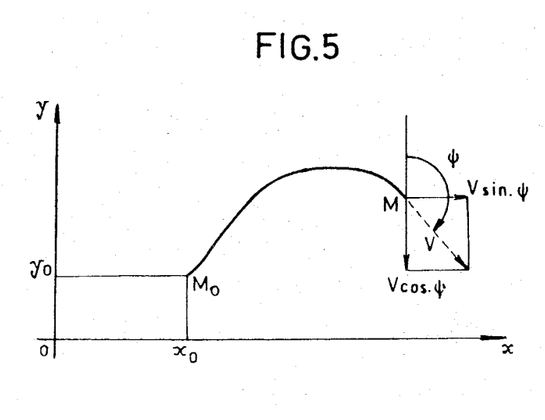
FIG. 5 is an explanatory graph.
Figure 6:
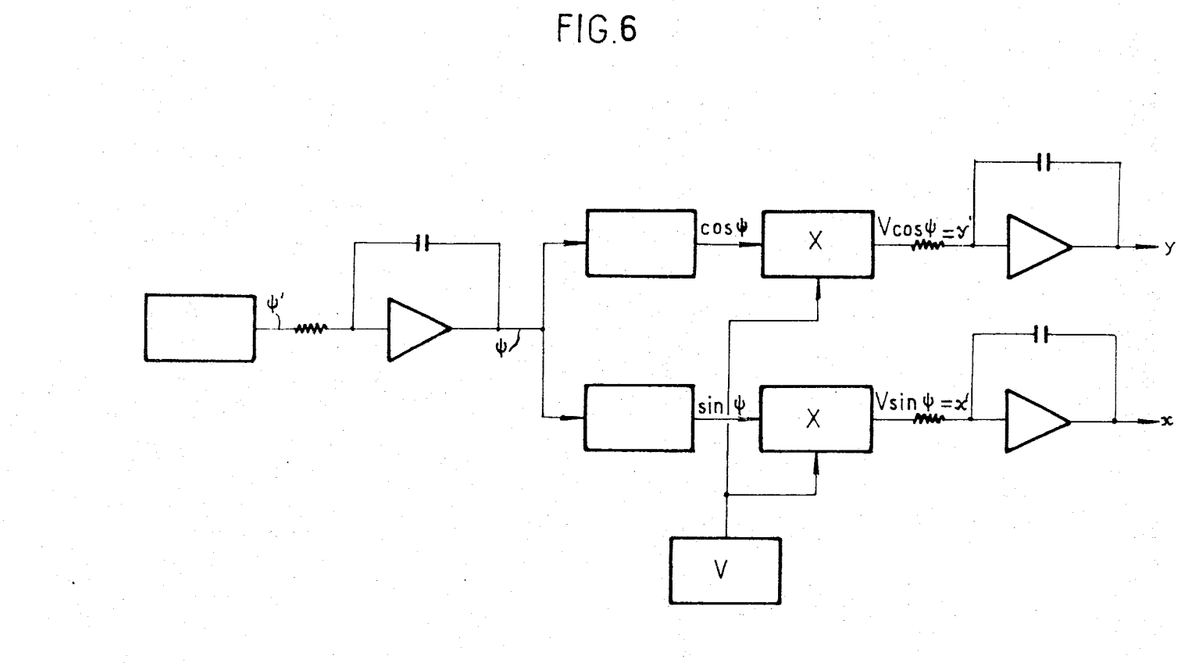
FIG. 6 is an explanatory circuit diagram of the principle of calculations leading from $\psi'$ and V to $x$ and $y$ in a simulator according to the invention.
Figure 7:
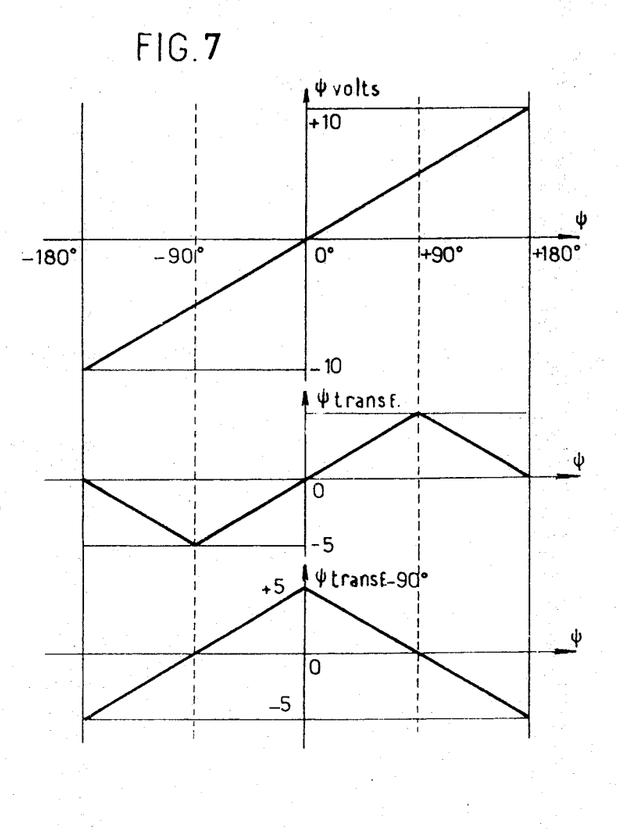
FIG. 7 is an explanatory graph.

Reference is now made to FIG. 5, which is an explanatory graph. Given a moving body M in the plane x0y, then if its initial position $(x_o, y_o, t_o,)$ and if at each instant its speed V and its angular speed $\psi'$ are known, its trajectory is completely defined. It is possible to calculate $V\sin\psi$ and $V\cos\psi$ and FIG. 6 gives the corresponding circuit diagrams. For reasons of simplicity the "cosine" circuit is replaced by a second "sine," circuit, the input of which has a phase difference of $-90°$; since the "sine" circuit operates from $-90°$ to $+90°$, it is necessary to transform the angle $\psi$ as shown in FIG. 7 in order that the rotation may take place through 360°.

Figure 8:
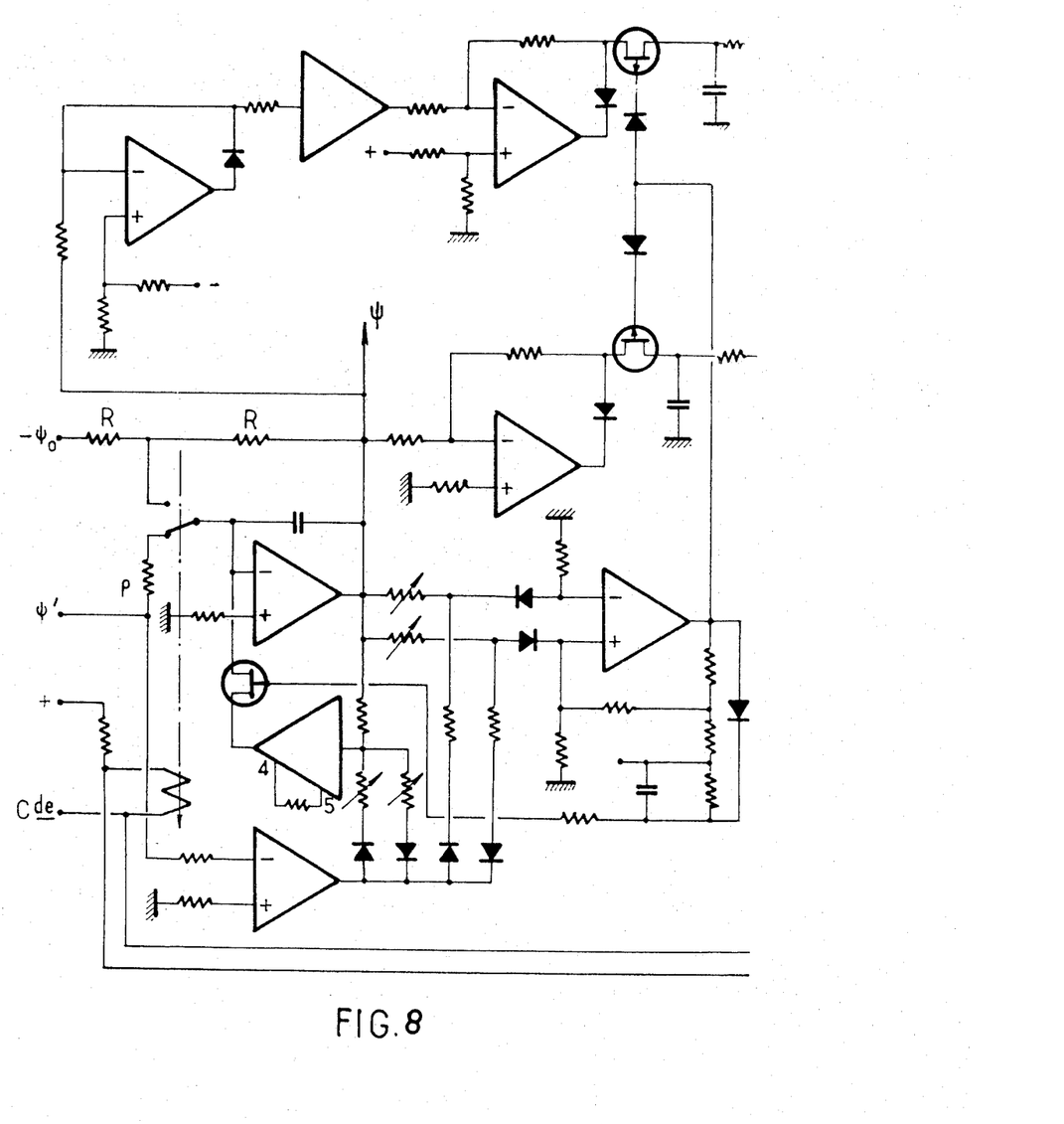
FIGS. 8 and 9 assembled according to FIG. 10 gives the circuit diagram of a trajectory simulator of FIG. 3 or FIG. 4.
Figure 9:
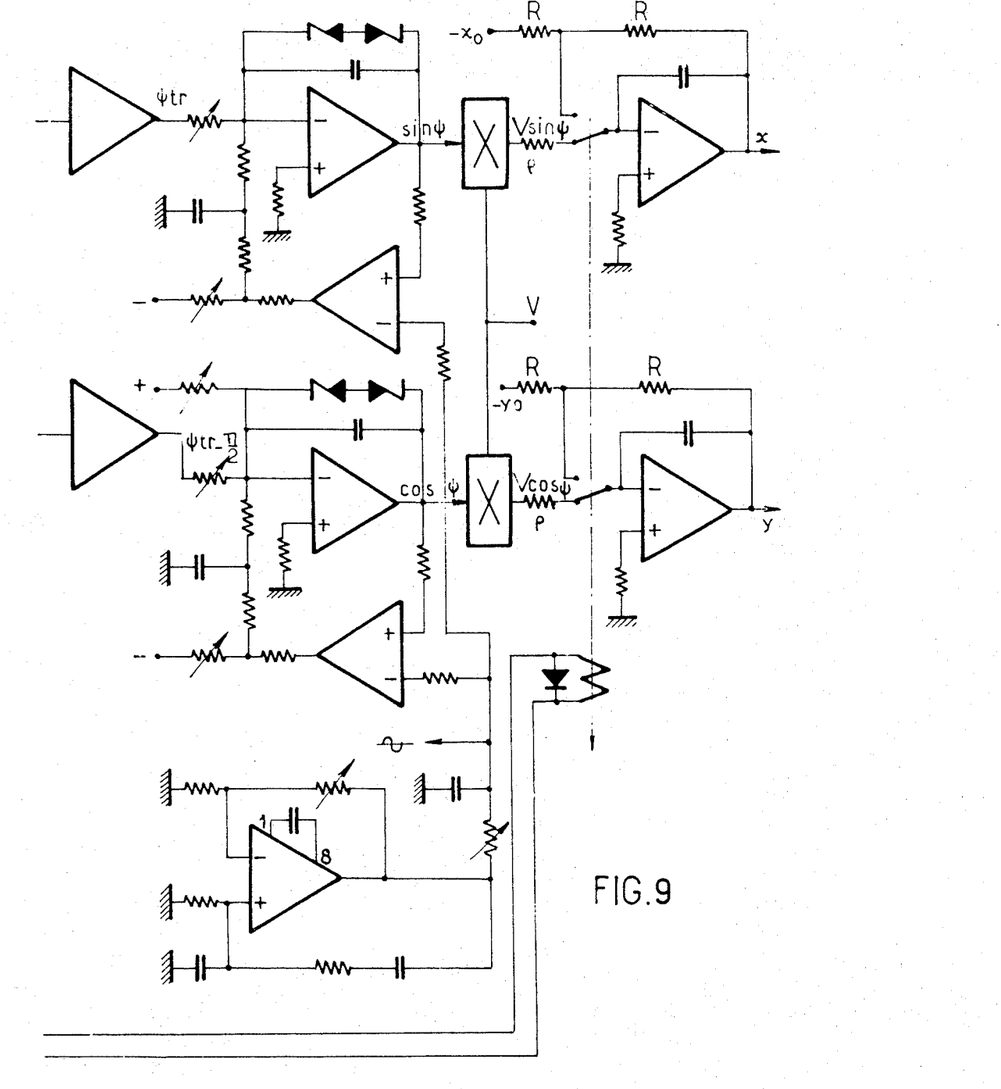
Figure 10:
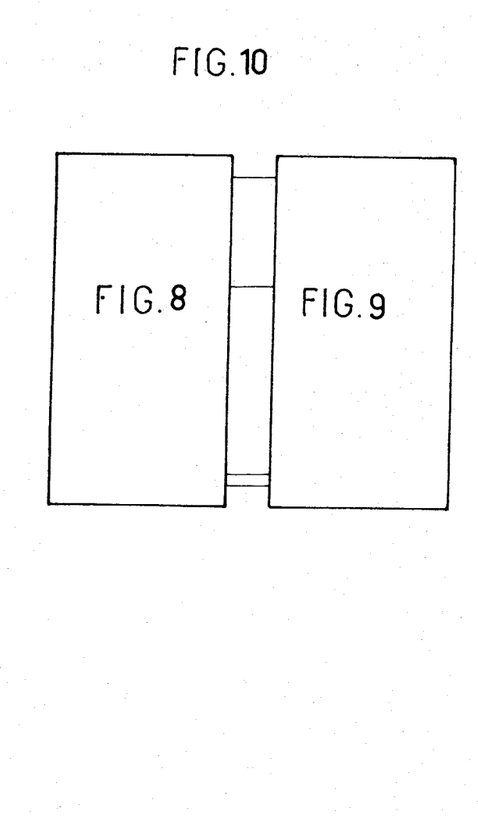

Reference is now made to FIGS. 8 and 9 which, assembled as shown in FIG. 10, give the circuit diagram of a trajectory simulator, corresponding to the elements identified by references 11, 15, 43, 44 in FIGS. 1 and 4. This diagram includes resistances R and $\rho$ purely by way of example, satisfactory results have been obtained by letting $R = 10k\Omega$ and $\rho = 200$ k$\rho$ for the trajectory simulators 11 and 15, and $R = 51$ k$\Omega$ and $\rho = 5M\rho$ for the mock-ups of aircraft 43 and 44 of FIG. 4, which gives a reduction of time 25 times greater in the simulators than in the mock-ups.

The circuits which calculate $a_{is} = \sqrt{X_i^2 + Y_i^2}$ from its rectangular components $X_i$ and $Y_i$, and which must operate with precision and speed, are fairly complex (circuits 21, 22, 23, 24 of FIG. 1). This can be simplified by replacing it by a simple modular addition:

$$d_{is} = |X_i| + |Y_i|$$

Figure 11:
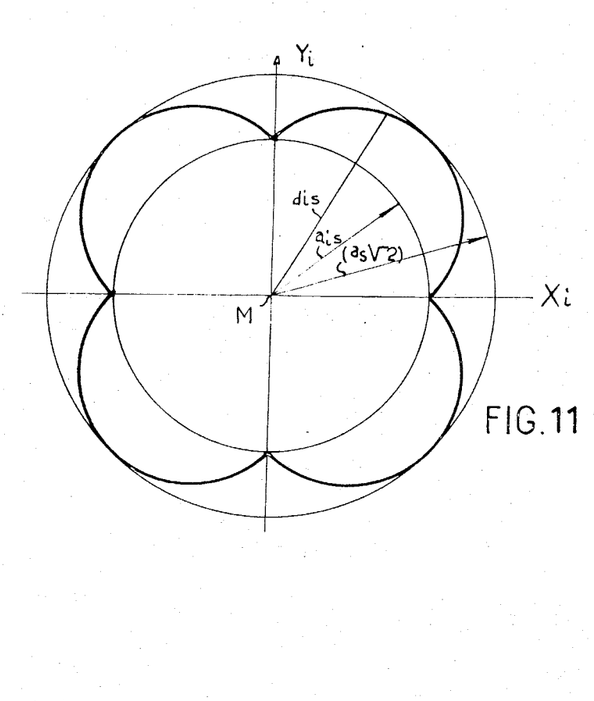
FIG. 11 is an explanatory graph.

It will be noted (FIG. 11) that this distance $d_{is}$, which varies according to a scalloped curve composed from semi-circumferences, always satisfies the condition:

$$a_{is} \leq d_{is} \leq a_{is} \sqrt{2}$$

this replacement amounts to taking a reference distance S sometimes increased by at the most the factor $\sqrt{2}$, which is not a disadvantage.

Figure 12:
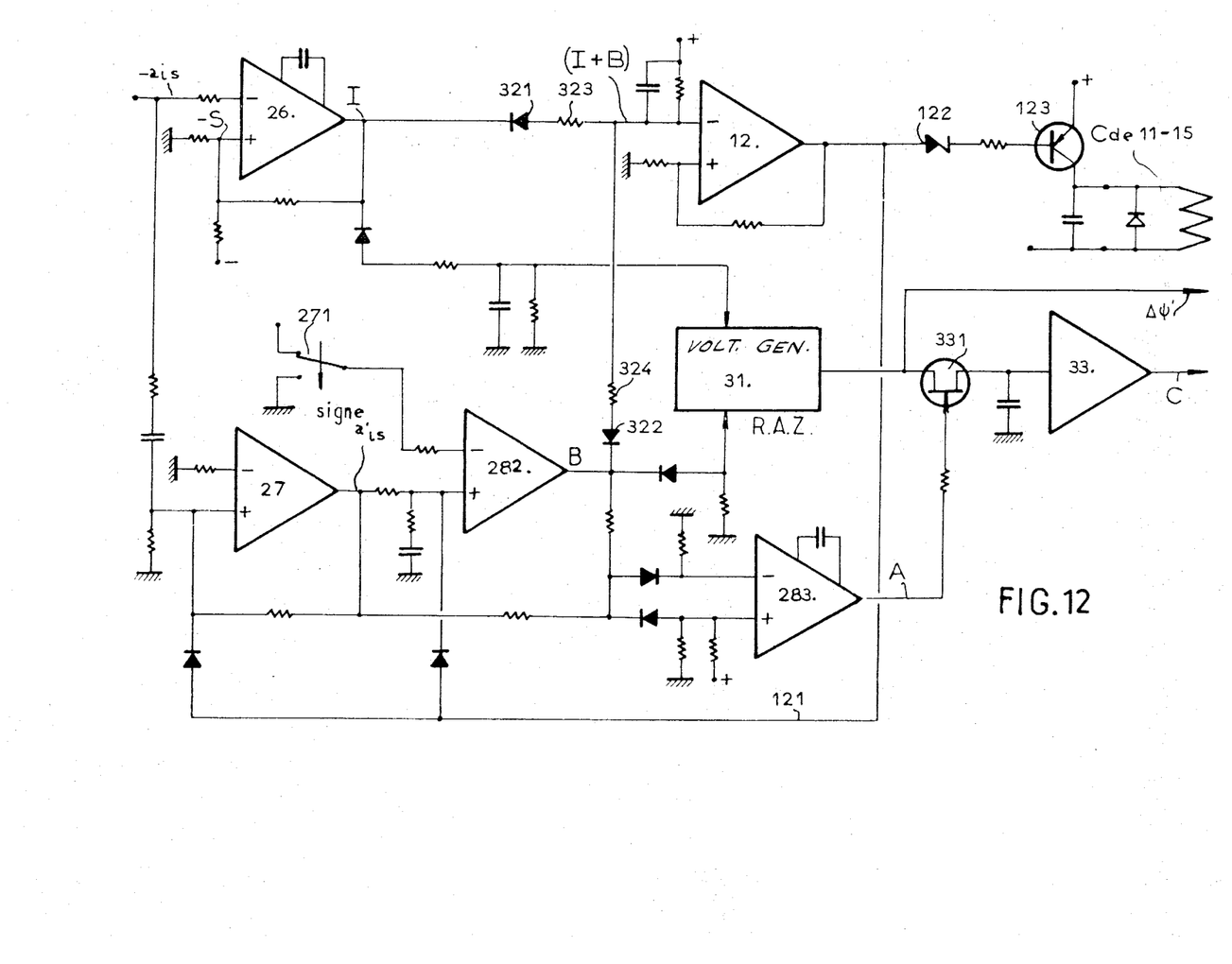
FIG. 12 is a circuit diagram for the logic circuits of FIG. 1.

Reference is now made to FIG. 12, which is a circuit diagram for the logic circuits of FIG. 1. FIG. 12 shows the comparator 26 and the voltage generator 31 (described hereafter); the adding device 32 (FIG. 1) is shown in FIG. 12 formed by two current paths each having a diode 321 or 322 and a resistance 323 or 324 respectively. The monostable circuit 12 supplies the control coils of the simulators 11 and 15 by means of a Zener diode 122 and a transistor 123. In this embodiment, the pulse generator 28 comprises two operational amplifiers 282,383, the first of which receives the sign signal of $a_{ts}'$ from the derivation unit 27. By means of pulse A the generator 28 controls a field effect transistor 331 supplied with the signal $\Delta\psi'$ by the voltage generator 31, (this transistor being in the input line of the blocking circuit 33) and then by pulse B the resetting to zero of the voltage generator 31.

Figure 13:
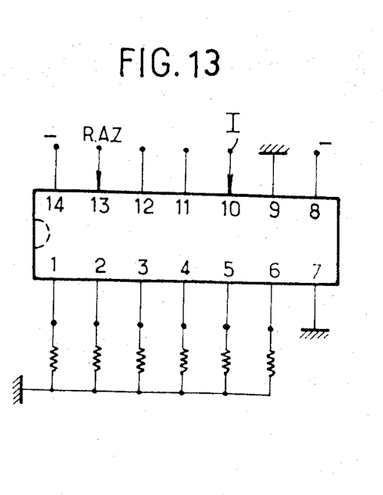
FIGS. 13 and 14 are diagrams for the voltage generator of FIG. 1.
Figure 14:
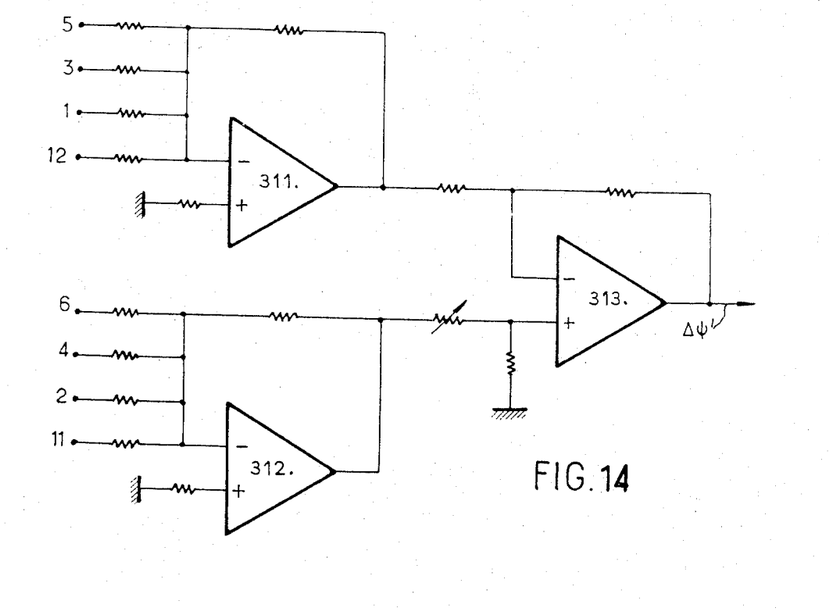
Figure 15:
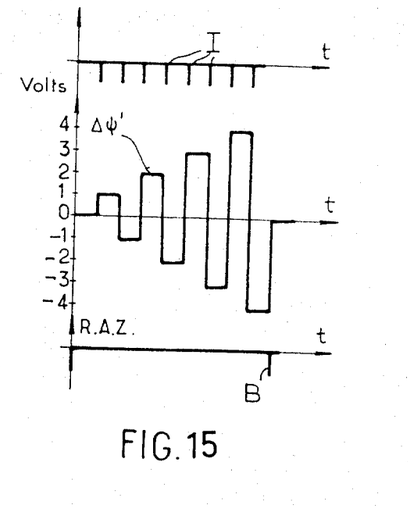
FIG. 15 is a graph of various signals present in FIG. 13.

Reference is now made to FIGS. 13 and 14, which are circuit diagrams for the voltage generator 31 of FIG. 1: in this embodiment an integrated circuit (FIG. 13) is used, constituting an eight figure shift register having a series connected input and parallel outputs and a numerical-analog converter (FIG. 14), comprising three operational amplifiers 311,312 and 313. It is shown (FIG. 15) that $\Delta\psi' = 1$ volt, corresponding to 1.6°/second, and $\pm 4$ $\Delta\psi'$ is sufficient as a maximum turning instruction.

What is claimed is:

1. A trajectory supervision and correction system for a moving body equipped with controls and with said system and adapted for moving along its own trajectory in a space in which at least one other object constituting a relevant object is stationary or moving and with respect to which said moving body thus equipped must move and with regard to which it must fulfill certain imperatives, said system comprising:

means for simulating in a reduced period of time, firstly the actual relative trajectory of the moving body with respect to said relevant object, then a succession of hypothetical relative trajectories of alternate and increasing values, each of said relative trajectories of said succession diverging from said actual relative trajectory, the body following each said hypothetical trajectory in response to modification of its linear or angular speed, means for calculating, for each of said hypothetical trajectories, the distances at which the moving body following the hypothetical tracjectory would pass with respect to the relevant object, means for immediately comparing of said distances thus calculated with a constant reference value, means for interrupting the trajectory simulations as soon as the resulting comparison reveals a distance in accordance with the imperatives, and means responsive the aforesaid means for sending instructions to the controls of the said moving body for the modification of the linear or angular speed.

2. A system according to claim 1 comprising further means operative so that, in the case where the imperative is an imperative of avoidance and after instructions in respect of the last moving or stationary relevant object, the said system operates in respect of a further stationary or moving relevant object.

3. A system according to claim 1 comprising further means for allowing said system to respond to the sign of a derivative with respect to time of the distance between the moving body following its simulated actual relative trajectory and the moving or stationary relevant object in such a manner that, in the case where the imperative is an imperative of avoidance, said system does not carry out any simulation if, at the same time said simulated distance is greater than said reference distance and its derivative is positive.

4. A system according to claim 1 comprising further means for allowing said system to respond to the sign of the derivative with respect to time of the distance between the moving body thus equipped following its simulated actual relative trajectory and the moving or stationary relevant object in such a manner that, in the case where the imperative is an imperative of approach, said system does not carry out any simulations if, at the same time the said simulated distance is less than the reference distance, and its derivative is negative.

5. A system according to claim 1 comprising means for carrying out said calculations by replacing said distance at which it would cause a moving body thus equipped to pass with respect to the object, by the sum of moduli of its two rectangular co-ordinates.

6. A system according to claim 1 comprising mockups simulating said trajectories of the moving body and of the said relevant object, and means for making these visual.

7. A trajectory supervision and correction system for a moving body equipped with controls and with said system and adapted for moving along its own trajectory in a space in which at least one other object constituting a relevant object is stationary or moving and with respect to which said moving body thus equipped must move and with regard to which it must fulfill certain imperatives, said system comprising:

means for simulating in a reduced period of time, firstly the actual relative trajectory of the moving body with respect to said relevant object, then a succession of hypothetical relative trajectories of alternate and increasing values, each of said relative trajectories of said succession diverging from said actual relative trajectory, the body following each said hypothetical trajectory in response to modification of its linear or angular speed, means for calculating, for each of said hypothetical trajectories, the distances at which the moving body following the hypothetical trajectory would pass with respect to the relevant object, means for immediately comparing each of said distances thus calculated with a constant reference value, means for interrupting the trajectory simulations as soon as the resulting comparison reveals a distance in accordance with the imperatives, and means responsive the aforesaid means for sending instructions to the controls of the said moving body for the modification of the linear or angular speed, said system further comprising a monostable circuit, a first adding device providing a sum, two subtracting devices, a trajectory simulator for the moving body M receiving its initial co-ordinates $x_o = 0$ $y_o = 0$ and its initial course $\psi o$ and receiving under the control of a monostable circuit its initial speed Vo and the sum provided by said adding device, said sum being of the initial course variation $\psi o'$ and a simulated turning order $\Delta\psi'$ of said moving body, a trajectory simulator for the relevant object $M_i$, receiving from a convertor the initial distance $a_{to}$ and the initial bearing $\gamma io$ of the relevant object $M_i$ transformed into its initial co-ordinates $x_{io}$ and $y_{io}$, receiving the initial course $\psi io$ of the relevant object $m_i$ and under the control of said monostable, receiving its initial speed $V_{io}$ and its initial course variation $\psi'io$ said simulators providing the signals $xy$ and $x_i\, y_i$ at said two subtracting devices, said subtracting devices providing the differences $X_i = x_i - x$ and $Y_i = y_i - y$ to two logic circuits which calculate the squares thereof $X_i^2$ and $Y_i^2$, a second adding device calculating its total $X_i^2 + Y_i^2$, a logic circuit calculating $\sqrt{X_i^2 + Y_i^2} = a_{is}$, the relative simulated distance of the relevant object $M_i$, a comparator comparing said distance $a_{is}$ with reference distance S and emitting a pulse 'I' depending on the sign of their difference, a derivation circuit receiving said signal $a_{is}$ and depending on the sign of its derivative with respect to time controlling a pulse generator, a voltage generator controlled by the comparator and the pulse generator sending to said first adding device the above said simulated turning order $\Delta\psi'$, and by means of an adding device, controlling said monostable device, and a blocking device, controlled by the pulse generator and acting on the controls of the moving body 'M.'

* * * * *

UNITED STATES PATENT OFFICE
CERTIFICATE OF CORRECTION

Patent No. 3,784,300            Dated   January 8, 1974

Inventor(s)   Guy Claude Willoteaux

It is certified that error appears in the above-identified patent and that said Letters Patent are hereby corrected as shown below:

On the cover sheet item [73] should read as follows:

-- Assignee: Societe Francaise d'Equipements pour la

Navigation Aerienne Aerodrome de Villacoublay --.

Signed and sealed this 30th day of April 1974.

(SEAL)
Attest:

EDWARD M. FLETCHER, JR.           C. MARSHALL DANN
Attesting Officer                 Commissioner of Patents